Figure 1:
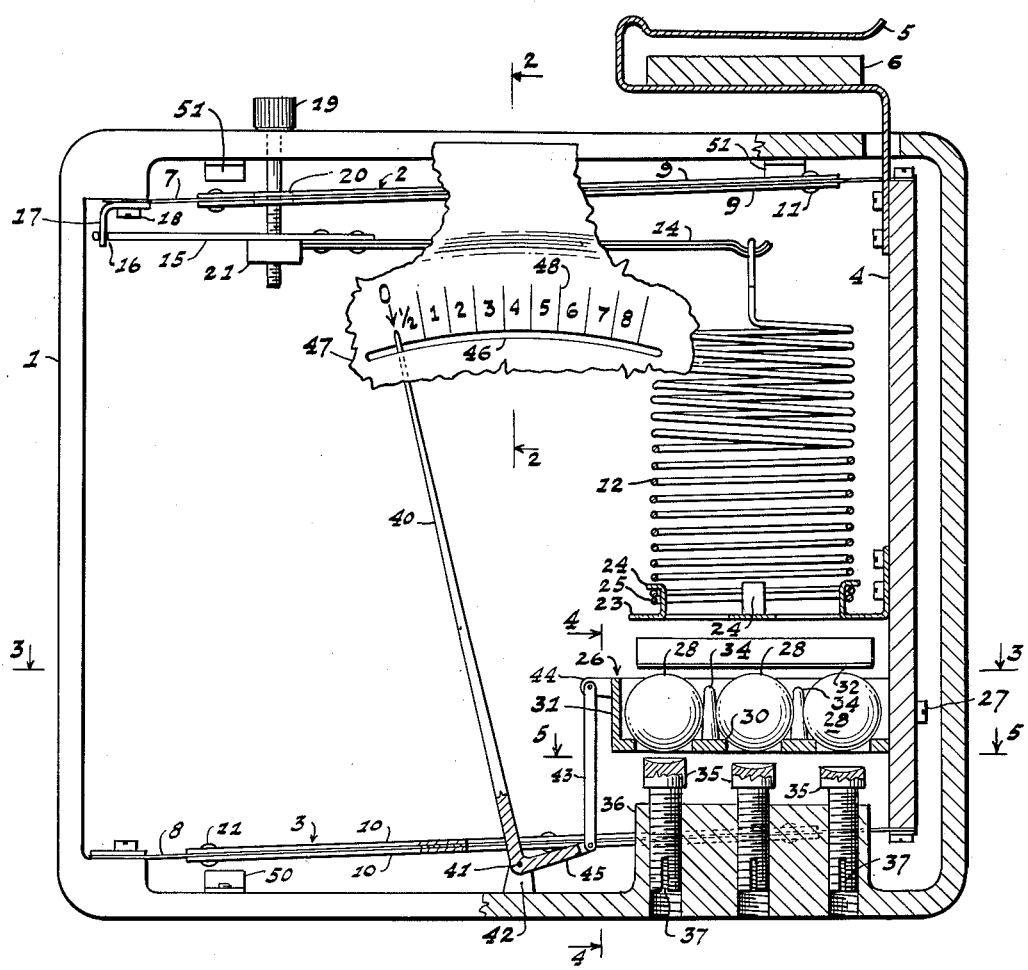

Aug. 30, 1955      W. STELZER      2,716,546

WEIGHING MECHANISMS

Filed April 5, 1954      2 Sheets-Sheet 1

INVENTOR.
William Stelzer

Aug. 30, 1955 W. STELZER 2,716,546
WEIGHING MECHANISMS
Filed April 5, 1954 2 Sheets-Sheet 2

INVENTOR.
William Stelzer

United States Patent Office 2,716,546
Patented Aug. 30, 1955

2,716,546

WEIGHING MECHANISMS

William Stelzer, Summit, N. J.

Application April 5, 1954, Serial No. 421,042

8 Claims. (Cl. 265—68)

The invention relates to weighing mechanisms, and more particularly to self-indicating weighers using a spring type resistant of nearly constant force to oppose the gravitational force of the load, and automatically deposited counterweights complementing the load to approximate the force of the resistant. The invention is related to the disclosure in my co-pending application Ser. No. 392,636, filed November 17, 1953.

The object of the invention is to devise a novel weigher usable as a postal scale or computing scale that is more completely in accordance with the essential principles of a perfect weighing instrument where the liability to error arising from faulty manipulation or faulty observation of the indicated weight is greatly reduced. The features sought are, first, the automatic and direct indication of the weight on which postage or the price of the goods is computed, second, portability and high accuracy, and third, simplicity of construction and consequent reduction of cost.

Another object is to construct an automatic weigher comprising a spring type resistant having a positive, though minimum rate of increase of force, and to compensate for said rate by a plurality of self-depositing complemental counterweights, each counterweight being of a predetermined weight smaller than a standard unit of weight so that the gravitational force of the counterweight plus the increase in the force of the resistant due to an increment of movement are equal to a standard unit of weight corresponding to such increment.

A further object is to provide adjusting means for the weight depositing mechanism, means to change the rate of the spring-type resistant, and means to automatically compensate for the change of force of the resistant resulting from a change in temperature.

Figure 2:
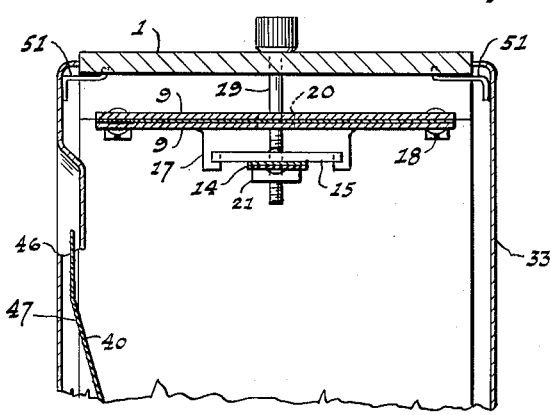
Figure 3:
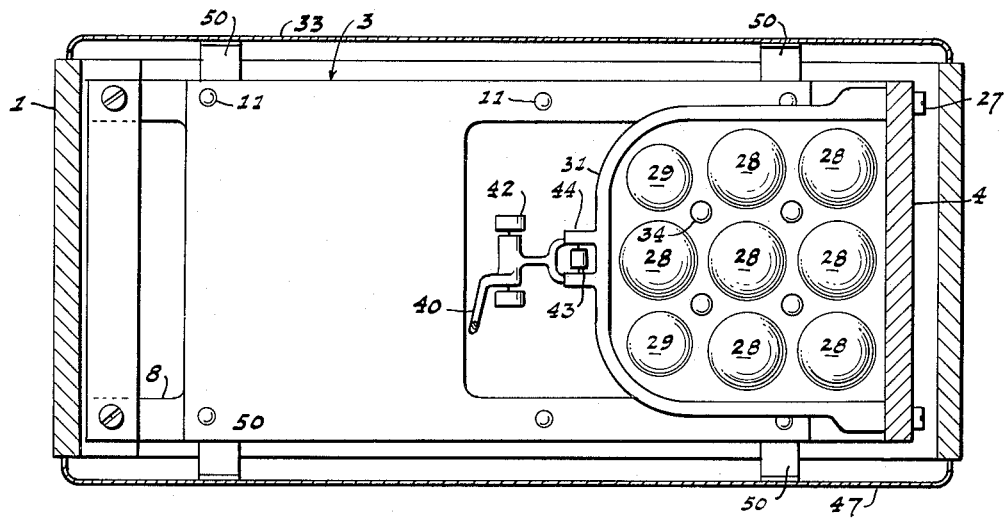
Figures 4, 5:
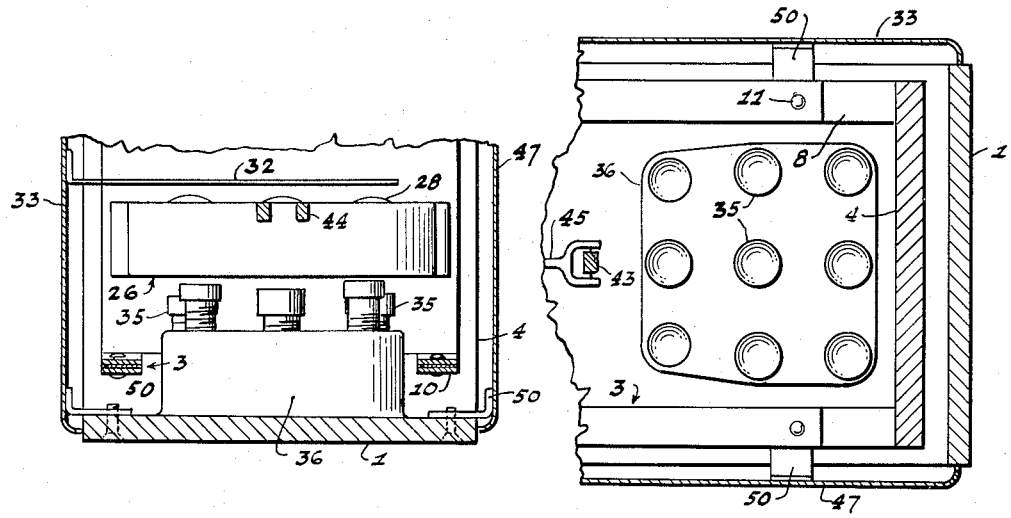

Other objects and advantages of this invention will be apparent from the following detailed description considered in connection with the accompanying drawings submitted for the purpose of illustration and not to define the scope of the invention, reference being had for that purpose to the subjoined claims. In the drawings, wherein similar reference characters refer to similar parts throughout the several views:

Fig. 1 is a front elevation of the improved weigher, partly shown in section;

Fig. 2, a section taken on lines 2—2 of Fig. 1;

Fig. 3, a sectional plan view taken on lines 3—3 of Fig. 1;

Fig. 4, a section taken on lines 4—4 of Fig. 1; and

Fig. 5, a section taken on lines 5—5 of Fig. 1.

Before explaining the present invention in detail, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not limitation.

The weigher shown comprises a rectangular frame 1 supporting the ends of a pair of parallel horizontal check links 2 and 3, the free ends of which are attached to a vertical load carrying member or spider 4 whose upper end has secured to it a platter 5 carrying a ballast weight 6 of exact and standard weight. The check links consist of thin leaf springs or ribbons 7 and 8 reinforced in the intermediate portion by plates 9 and 10 secured by rivets 11 or other suitable means.

A resistant consisting of a helical tension spring 12 is supported by the end of a bimetal strip 14 extending from an adjustable arm 15 pivoted at 16 to a bracket 17, the latter being secured to frame 1 by screws 18 which also secure the end of leaf spring 7. Arm 15 is manually adjustable by means of adjusting screw 19 passing through a clearance hole 20 in check link 2 and engaging a nut 21 which is prevented from turning by the end of bimetal strip 14. The latter serves to compensate for variations in the force of spring 12 resulting from changes in temperature, as it is well known that at higher temperatures the force of a spring is decreased. Thus the bimetal strip is positioned so that the metal having the higher coefficient of expansion is underneath to stretch spring 12 when the temperature is increased. The lower end of helical spring 12 engages a bracket 23 secured to load carrying member 4 and having small tabs or hooks 24 over which the lowermost coils of the spring are threaded, this arrangement affording adjustment of the rate of the spring, as increasing the number of inactive coils 25 increases the rate of the spring. Another bracket or shelf 26 secured to load carrying member 4 with screws 27 serves to support a plurality of counterweights in the form of balls 28 and 29 seated on the edges of round holes 30. Spilling of the balls is prevented by wall 31 and baffle plate 32 extending from back cover 33, while small upright pins 34 serve as baffles between the balls themselves. Underneath and in alignment with each ball 28 and 29 or hole 30 is an adjustable stationary support 35 threaded into a pad 36 extending from frame 1. Each support has a concave seat whose curvature is described by a spherical radius greater than that of the ball which it seats. This is to allow for adjustment of the ball in case of a minor misalignment between hole 30 and support 35. The supports 35 are adjusted to different heights so that during the descent of load carrying member 4 balls 28 and 29 are successively deposited on supports 35, one after the other. The shanks of supports 35 are threaded and have slots 37 for the insertion of a tool, such as a screw driver, and to provide a self-locking feature through the resiliency of the lower ends of the shank which have been spread apart prior to assembly.

The movement of the load carrying member 4 is transmitted to an indicator needle or pointer 40, pivotally supported at 41 on brackets 42 extending from frame 1, by a connecting rod 43 pivotally connected to bearing supports 44 extending from bracket 26 and to an arm 45 extending from the pivoted end of pointer 40. The pivots or bearings of pointer 40 and connecting rod 43 may be of the needle point type, or any other known pivoted or flexible joint may be used that reduces friction to a minimum and provides accurate transmission of the movement of member 4. The outer or free end of pointer 40 extends through a slot 46 in front cover 47 of which only a fragment is shown in Fig. 1. This cover, as well as the back cover, is secured by lugs 50 and 51 to frame 1, the lugs being preferably welded to the cover. The outer face of cover 47 carries graduations 48 and a chart which may contain a series of price indications or postage due, as well as the weight applying in the computation. In the illustration, the numerals between the graduations indicate the weight in ounces, and 0 the index line to which the pointer should point when no load is on platter 5 and all counterweights are carried on shelf 26.

Spring 12 is of such strength and so adjusted that it counterbalances the gravitational force acting on the load carrying member 4 when the latter carries all the weights and no load, and pointer 40 points to zero. It is desirable that spring 12 has a minimum rate, i. e., that its force increases as little as possible when member 4 descends. The rate can be reduced by increasing the diameter and number of coils, but since there is a practical limit to size, a certain rate is not avoidable. The rate is further increased by leaf springs 7 and 8 which must be considered a part of the resistant. Their rate can be reduced by decreasing their thickness and by lengthening check links 2 and 3. To compensate for the increase in force or resistance of spring 12 and leaf springs 7 and 8 as member 4 descends, I reduce the weights 28 and 29 to weigh slightly less than a standard weight. The reduction is equal to the increase in force of the resistant per increment of travel or descent from one deposition of a weight to the next. Thus after each deposition of a weight the rate of the resistant is fully compensated, but during the steps of the load carrying member the last fraction of a unit of weight is indicated in the same manner as in a spring scale.

In order to illustrate the principle of the invention, the operation will be explained by way of example. With no load on platter 5 and all weights carried by the load carrying member, the weigher is adjusted so that the pointer points to zero and supports 35 are at different elevations so that at equal increments of descent of member 4 counterweights are deposited one at a time, on supports 35. The balls 29 weigh slightly less than one half ounce each. Their corresponding supports are at the highest and second highest elevation so that balls 29 are deposited first when member 4 descends. Balls 28 are each slightly less than one ounce in weight and are deposited one after the other following the deposition of the one half ounce weights. Assuming that the rate of increase of force of the resistant is $\frac{1}{50}$ oz. per step, then if a load of $\frac{1}{100}$ oz. is placed on platter 5 the load carrying member 4 descends until the first ½ oz. ball touches its support and pointer 40 points squarely to numeral ½. The distance between the index line and numberal ½ is only half that between the other numerals, and load carrying member 4 descends only half a step before the first ½ oz. ball touches its support. All the balls are exactly $\frac{1}{50}$ oz. lighter than the standard weight, balls 29 weighing $\frac{24}{50}$ oz. and balls 28 weighing $\frac{49}{50}$ oz. If the load on platter 5 is increased to exactly ½ oz., then pointer 40 is aligned with the graduation line between numerals ½ and 1 whereby the first ½ oz. weight is fully deposited. Further increase in the load causes pointer 40 to move towards the right whereby at $\frac{51}{100}$ oz. load, the pointer points at 1 and the second ½ oz. ball touches its support, remaining in this position, while the load is further increased, until at $\frac{99}{100}$ oz. the second ½ oz. ball is fully deposited whereby at exactly 1 oz. load the pointer is aligned with the graduation mark dividing numerals 1 and 2. At 1 $\frac{1}{100}$ oz. load the first one ounce ball touches its support and pointer 40 points at numeral 2. With each additional ounce load another ball is deposited and another numeral indicated. The conditions at each step are identical. The total amount of underweight of the deposited counterweights fully compensates for the increase in force of the resistant at any stage of the descent of member 4. The compensation is in no way affected by the removal of ballast weight 6. The latter is a standard weight. If it weighs exactly eight ounces, the weighing range may be increased by eight ounces when weight 6 is removed from platter 5. The ballast weight may of course also be operated in the manner illustrated in the co-pending patent application mentioned hereinbefore, but the present embodiment is shown in the simplest form merely for purposes of illustration.

To some extent the rate of spring 12 is compensated by the action of pointer 40, the latter being top heavy so that it offers a gradually decreasing resistance to the descent of member 4. However, since pointer 40 should be as light as possible to reduce friction to a minimum, the compensating action is very small.

If it is desired to make the step between the index line and numeral ½ equal to the subsequent graduations, so that the distance of the descent of member 4 from the zero position to the contacting of the first ball by its support is equal to the distance between subsequent steps, then the ½ oz. counterweight which is deposited first should be further reduced in weight; in the example given it should weigh only $\frac{47}{100}$ oz. because the distance between the index line and the first graduation line would be 1½ times the distance between the other graduations.

Having thus described my invention, I claim:

1. An automatic weigher comprising a vertically movable load carrying member for supporting a load to be weighed, a resistant comprising at least one spring having a small rate of increase of force to produce a lifting force to oppose the gravitational force acting on said load carrying member, a plurality of counterweights adapted to be supported by said load carrying member, stationary supporting means arranged to receive said counterweights so that during the descent of said load carrying member said counterweights are successively deposited on said stationary supporting means to gradually relieve said load carrying member of the burden of said counterweights, each of said counterweights being lighter in weight than a standard unit of weight, the difference in weight between a standard unit of weight and one counterweight being equal to the rate of increase in force of said resistant due to the movement of said load carrying member between the deposition of a counterweight and the subsequent deposition of said one weight, and indicating means related to the position of said load carrying member to be indicative of the weight of said load in standard units of weight.

2. The construction as claimed in claim 1, and means to adjust said stationary supporting means to control the distance of movement of said load carrying member between one deposition of a counterweight and the next.

3. The construction as claimed in claim 1, and means to adjust the rate of said spring.

4. The construction as claimed in claim 1, and a removable ballast weight of standard weight carried by said load carrying member to increase the range of said weigher.

5. The construction as claimed in claim 1, where said indicating means is adapted to partially compensate for the rate of said spring.

6. An automatic weigher comprising a vertically movable load carrying member to support a load to be weighed, parallel check links comprising leaf springs arranged to guide said load carrying member to move in a vertical path where all points of said load carrying member have equal velocity, a resistant arranged to oppose the gravitational force of said load carrying member, said leaf springs acting to augment said resistant and having a positive rate of increase of force, a plurality of counterweight adapted to be supported by said load carrying member, stationary supporting means arranged to receive said counterweights so that during the descent of said load carrying member said counterweights are successively deposited on said stationary supporting means to gradually relieve said load carrying member of the burden of said counterweights, each of said counterweights being lighter in weight than a standard unit of weight, to compensate for the rate of said leaf springs, whereby the force of said resistant as modified by said leaf springs is constant at each position where a counterweight is deposited, and indicating means related to the position of said load carrying member to be indicative of the weight of said load in standard units of weight.

7. An automatic weigher comprising a vertically movable load carrying member to support a load to be weighed, means to guide said load carrying member to provide a parallel motion where all points of said load carrying member have the same velocity, a spring type resistant having a positive but comparatively low rate arranged to oppose the gravitational force of said load carrying member, means to adjust the force of said resistant, a plurality of spherical counterweights supported by said load carrying member, stationary supporting means on which said counterweights are successively deposited at spaced intervals during the descent of said load carrying member so as to gradually relieve said load carrying member of the burden of said counterweights, the force of said resistant being adjusted to exactly counterbalance the gravitational force of said load carrying member carrying all counterweights but no load, said counterweights being lighter in weight than a standard unit of weight to compensate for the rate of said resistant, whereby the force of said resistant is constant at each position where a counterweight is deposited, and indicating means related to the position of said load carrying member to be indicative of the weight of said load in standard units of weight.

8. The construction as claimed in claim 7, and means to compensate for variations in force of said resistant due to changes in temperature.

No references cited.